United States Patent Office.

THOMAS W. NICHOLS, OF TROUT CREEK, NEW YORK.

Letters Patent No. 66,987, dated July 23, 1867.

---

IMPROVED SOAP.

---

The Schedule referred to in these Letters Patent and making part of the same.

---

TO ALL WHOM IT MAY CONCERN:

Be it known that I, THOMAS W. NICHOLS, of Trout Creek, in the county of Delaware, and State of New York, have invented a new and improved Liquid Soap; and I do hereby declare that the following is a full, clear, and exact description thereof, which will enable others skilled in the art to make and use the same.

In manufacturing this improved liquid soap I make use of the following ingredients, care being taken to manipulate them in the manner as hereinafter described: four pounds hard common soap; three pounds sal-soda; one-quarter pound starch; one pound beeswax; one pound glycerine; one-half pound tincture cantharides; water, twenty-eight gallons.

I first dissolve the beeswax in boiling alcohol, add to it a small quantity of the sal-soda, stir in gradually the liquid cantharides and glycerine, and set it aside for future use.

I cut the soap in small pieces, put it into one-half the water at boiling temperature, and add to this the remaining portion of sal-soda. I then raise the remaining portion of the water to boiling heat and pour in alternately the two compounds above named. The result of this union is the production of a beautiful liquid soap, exceedingly detergent, and capable of being manufactured at a small expense.

It is well known that beeswax boiled in alcohol is very readily saponified upon the addition of an alkali, more so, in fact, than almost any other fatty body. The fixed fatty principles of cantharides and glycerine brought in contact with an alkaline solution at a high temperature produce a saponaceous compound exceedingly pure, and unequalled as a detergent.

Having thus described my invention, I desire to make the following claim, in order to secure Letters Patent:

I claim the combination of the above ingredients used in the manner and for the purpose described.

I claim the use of cantharides, glycerine, and beeswax in the manner and for the purpose described.

THOMAS W. NICHOLS.

Witnesses:
THOMAS C. CONNOLLY,
GEORGE A. NOLEN.